(12) United States Patent
Foster

(10) Patent No.: US 6,973,841 B2
(45) Date of Patent: Dec. 13, 2005

(54) HIGH PRESSURE RETENTION VORTEX FLOW METER WITH REINFORCED FLEXURE

(75) Inventor: Jeffry D. Foster, Minneapolis, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 10/826,510

(22) Filed: Apr. 16, 2004

(65) Prior Publication Data

US 2005/0229715 A1    Oct. 20, 2005

(51) Int. Cl.$^7$ ............................................. G01F 1/32
(52) U.S. Cl. ................................................ 73/861.22
(58) Field of Search ........................ 73/861.22, 861.21, 73/861.23, 861.24

(56) References Cited

U.S. PATENT DOCUMENTS

| | | | |
|---|---|---|---|
| 1,935,445 A | 11/1933 | Heinz | 73/167 |
| 3,946,608 A | 3/1976 | Herzl | 73/194 |
| 4,033,189 A | 7/1977 | Herzl | 73/194 |
| 4,169,376 A | 10/1979 | Herzl | 73/194 |
| 4,201,084 A | 5/1980 | Ito et al. | 73/194 |
| 4,339,957 A | 7/1982 | Herzl | 73/861.24 |
| 4,464,939 A | 8/1984 | Corpron | 73/861.24 |
| 4,520,678 A | 6/1985 | Koziol et al. | 73/861.24 |
| 4,526,040 A | 7/1985 | Matsubara | 73/861.24 |
| 4,625,564 A | 12/1986 | Murakami et al. | 73/861.24 |
| 4,633,713 A | 1/1987 | Mesnard et al. | 73/866.5 |
| 4,645,242 A | 2/1987 | Coleman et al. | 285/158 |
| 4,699,012 A | 10/1987 | Lew et al. | 73/861.24 |
| 4,703,659 A | 11/1987 | Lew et al. | 73/861.24 |
| 4,706,503 A | 11/1987 | Kementser | 73/861.24 |
| 4,717,159 A | 1/1988 | Alston et al. | 277/1 |
| 4,782,710 A | 11/1988 | Nagumo et al. | 73/861.22 |
| 4,791,818 A | 12/1988 | Wilde | 73/861.24 |
| 4,803,870 A | 2/1989 | Lew | 73/861.22 |
| 4,835,436 A * | 5/1989 | Lew | 73/861.22 |
| 4,884,441 A | 12/1989 | Lew | 73/195 |
| 4,884,458 A | 12/1989 | Lew | 73/861.24 |
| 4,891,990 A | 1/1990 | Khalifa et al. | 73/861.24 |
| 4,911,019 A | 3/1990 | Lew | 73/861.24 |
| 4,926,532 A | 5/1990 | Phipps et al. | 29/25.35 |
| 4,926,695 A | 5/1990 | Kleven et al. | 73/861.24 |
| 4,972,723 A | 11/1990 | Lew | 73/861.24 |
| 4,973,062 A | 11/1990 | Lew | 73/861.24 |
| 4,984,471 A | 1/1991 | Storer | 73/861.24 |
| 5,076,105 A | 12/1991 | Lew | 73/861.24 |
| 5,095,760 A | 3/1992 | Lew | 73/861.24 |
| 5,109,704 A | 5/1992 | Lew | 73/861.24 |
| 5,197,336 A | 3/1993 | Tsuruoka et al. | 73/861.24 |
| 5,343,762 A | 9/1994 | Beulke | 73/861.24 |

(Continued)

FOREIGN PATENT DOCUMENTS

GB                823684            11/1959

(Continued)

*Primary Examiner*—Harshad Patel
(74) *Attorney, Agent, or Firm*—Westman, Champlin & Kelly, P.A.

(57) ABSTRACT

A vortex flow meter for measuring fluid flow has a conduit for carrying a fluid. A region of reduced thickness is formed in a portion of the conduit. A shedding bar disposed in the conduit is coupled to the region of reduced thickness and is configured to apply a rocking motion to the region of reduced thickness about a pivot line in response to flow of the fluid. At least one reinforcing rib on the reduced thickness portion preferably extends parallel to flow of fluid.

28 Claims, 3 Drawing Sheets

U.S. PATENT DOCUMENTS

| | | | |
|---|---|---|---|
| 6,053,053 A | 4/2000 | Huotari .................. | 73/861.22 |
| 6,412,353 B1 | 7/2002 | Kleven et al. ........... | 73/861.22 |
| 6,484,590 B1 | 11/2002 | Kleven et al. ........... | 73/861.22 |

FOREIGN PATENT DOCUMENTS

| | | |
|---|---|---|
| JP | 58160813 | 9/1983 |

\* cited by examiner

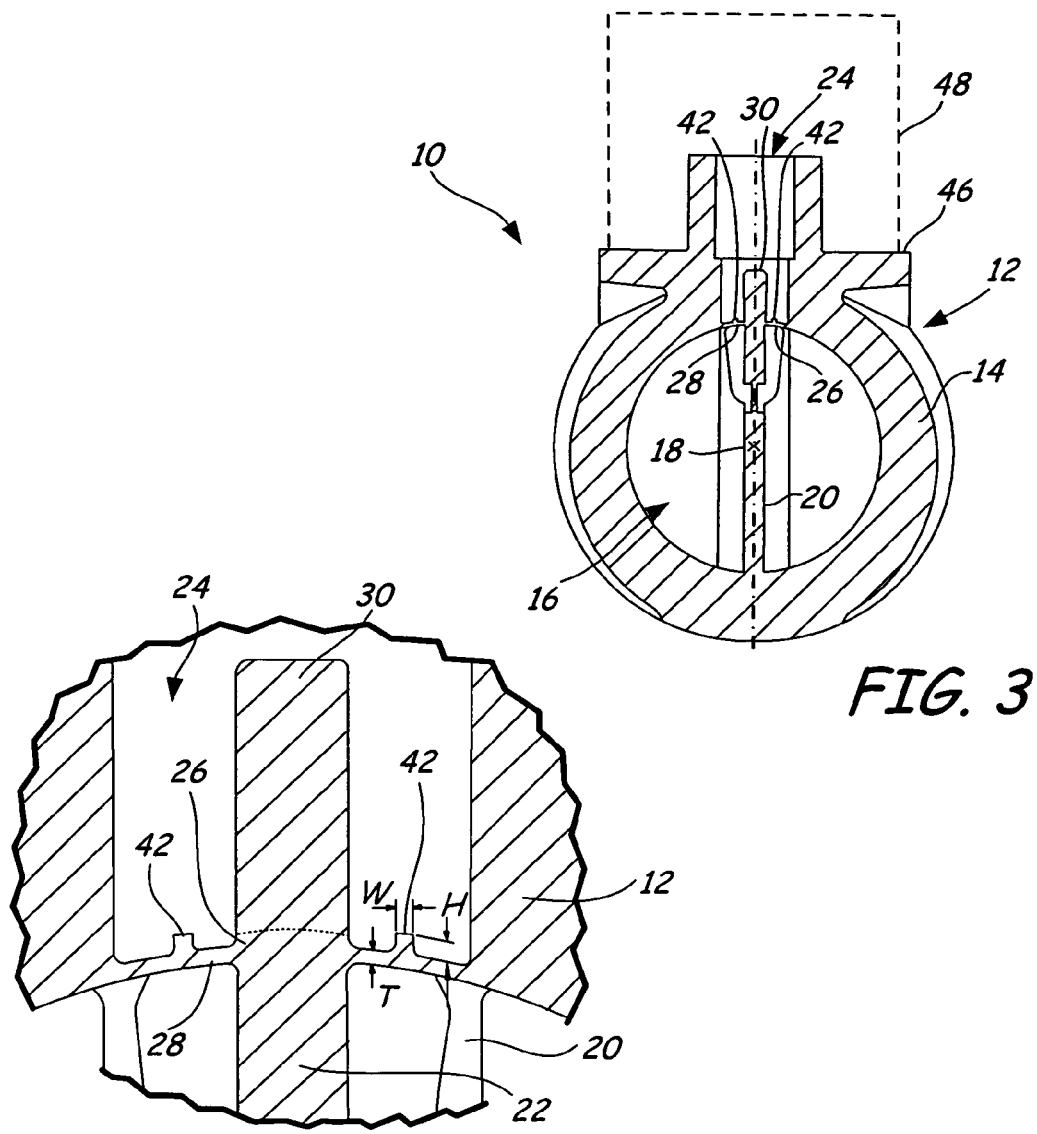
FIG. 3
FIG. 4
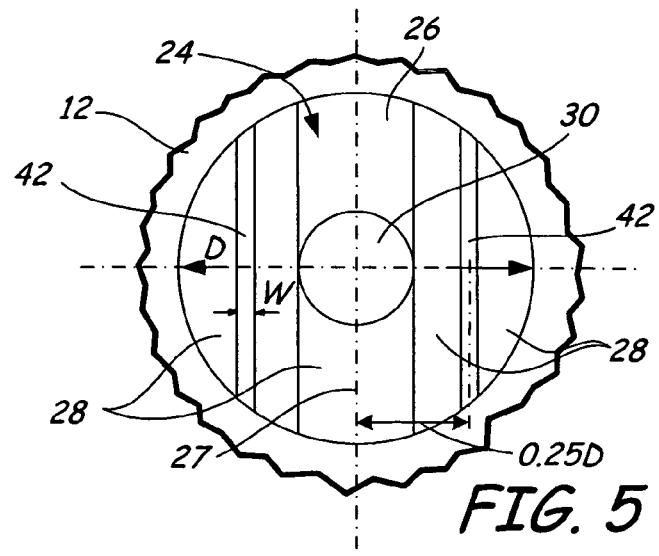
FIG. 5

HIGH PRESSURE RETENTION VORTEX FLOW METER WITH REINFORCED FLEXURE

BACKGROUND OF THE INVENTION

The present invention relates to a vortex flow meter for measuring fluid flow, and more particularly, a flow meter for use with high pressure process fluid.

Various differential pressure sensitive vortex flow meters have been advanced, which operate on a principle that a buff body or shedding bar placed in a fluid flow causes or generates vortices alternately on opposite sides of the shedding bar, causing variations in pressure on either side of the bar. The frequency of vortex shedding for an individual bar configuration characteristic is directly proportional to the velocity of flow in the stream.

Vortex flow meters are known in the prior art, and examples of vortex flow meter implementations can be found in U.S. Pat. No. 4,926,695 issued to Kleven et al. on May 2, 1990, U.S. Pat. No. 5,343,762 issued to Beulke on Sep. 6, 1994, which are incorporated herein by reference.

Typically, a vortex flow meter for measuring fluid flow includes a conduit having a wall surrounding a bore for carrying the fluid. The wall has a wall region of reduced thickness formed therein. The wall region of reduced thickness is sometimes referred to as a "region of reduced stiffness" or a "flexure". A shedding bar is disposed in the bore. In a typical embodiment, the shedding bar includes an upstream extremity, a downstream extremity and an intermediate portion connecting the upstream and downstream extremities. The intermediate portion includes a region of reduced stiffness which flexes in response to disturbances or vortices within the fluid created by fluid flow around the upstream extremity to promote motion of at least a portion of the downstream extremity. Such flow meters further include sensing means coupled to the downstream extremity for sensing the motion and providing an output as a function thereof. Generally, the sensing means senses lateral motion, and is removably attached to a post extending from the wall region away from the bore, wherein the post transmits the motion to the sensing means.

One method of assuring that a vortex meter meets process pressure retention (strength) requirements is described in the American Society of Mechanical Engineers (ASME) Boiler Pressure Vessel Code (BPVC). To determine the factor of safety the meter has at a given pressure, a meter representative of the design is pressurized until the structure bursts. Factors are derived from testing of the first meter body produced, and calculations are performed based on various factors of the material utilized to make the device. For example, material characteristics, including composition and manufacturing processes, are factored into a calculation to determine the maximum pressure to which a device may be rated.

For higher pressures, the flexure often presents a weak point in the structure, which can tear or burst open when exposed to higher pressures. Since the flexure must be designed to be thin enough to permit movement of the post that is coupled to the buff body or shedding bar, conventional flexures have difficulting providing the required safety factor at high pressures.

SUMMARY

A vortex flow meter for measuring fluid flow has a conduit for carrying a fluid. A region of reduced thickness is formed in a portion of the conduit. A shedder bar disposed in the conduit is coupled to the region of reduced thickness and is configured to apply a rocking motion to the region of reduced thickness about a pivot line in response to flow of the fluid. At least one reinforcing rib on the reduced thickness portion extends parallel to flow of the fluid.

BRIEF DESCRIPTION OF THE DRAWINGS

FIG. 3 is a cross-sectional view of a flow meter taken along line 3—3 in FIG. 1.

FIG. 4 is an expanded view of the region of reduced thickness taken in cross-section along line 3—3 in FIG. 1.

FIG. 5 is a top view of the region of reduced thickness of FIG. 1.

DETAILED DESCRIPTION

In order to qualify for use in a particular pressure rating, users are required to withstand a burst pressure test that gives effective safety factor according to the ASME BPVC.

$$\text{Burst} > (\text{safety factor}) \times \frac{PR}{(F \times R)}$$

where PR is the maximum operating pressure for a pressure rating, F is a casting quality factor, and R is the ratio of actual to minimum tensile strength of the material utilized in the particular implementation. The safety factor may depend on the specific usage and the implementation.

The present invention includes a modification to conventional flexures (sometimes referred to as regions of reduced wall thickness) to include a rib to extend across the flexure in the direction of flow on either side of the center line of the flexure. Additionally, the size of a center rib disposed on the center line of the flexure is increased. With these enhancements, the flexure is able to retain (withstand) a pressure that is approximately 150% that of a conventional meter. Additionally, the side ribs increase the sensitivity of the meter to alternating pressure created by the shedding bar, by reducing the countervailing force on the sensor due to pressure on the rigid center flexure of the meter.

Figure 1:
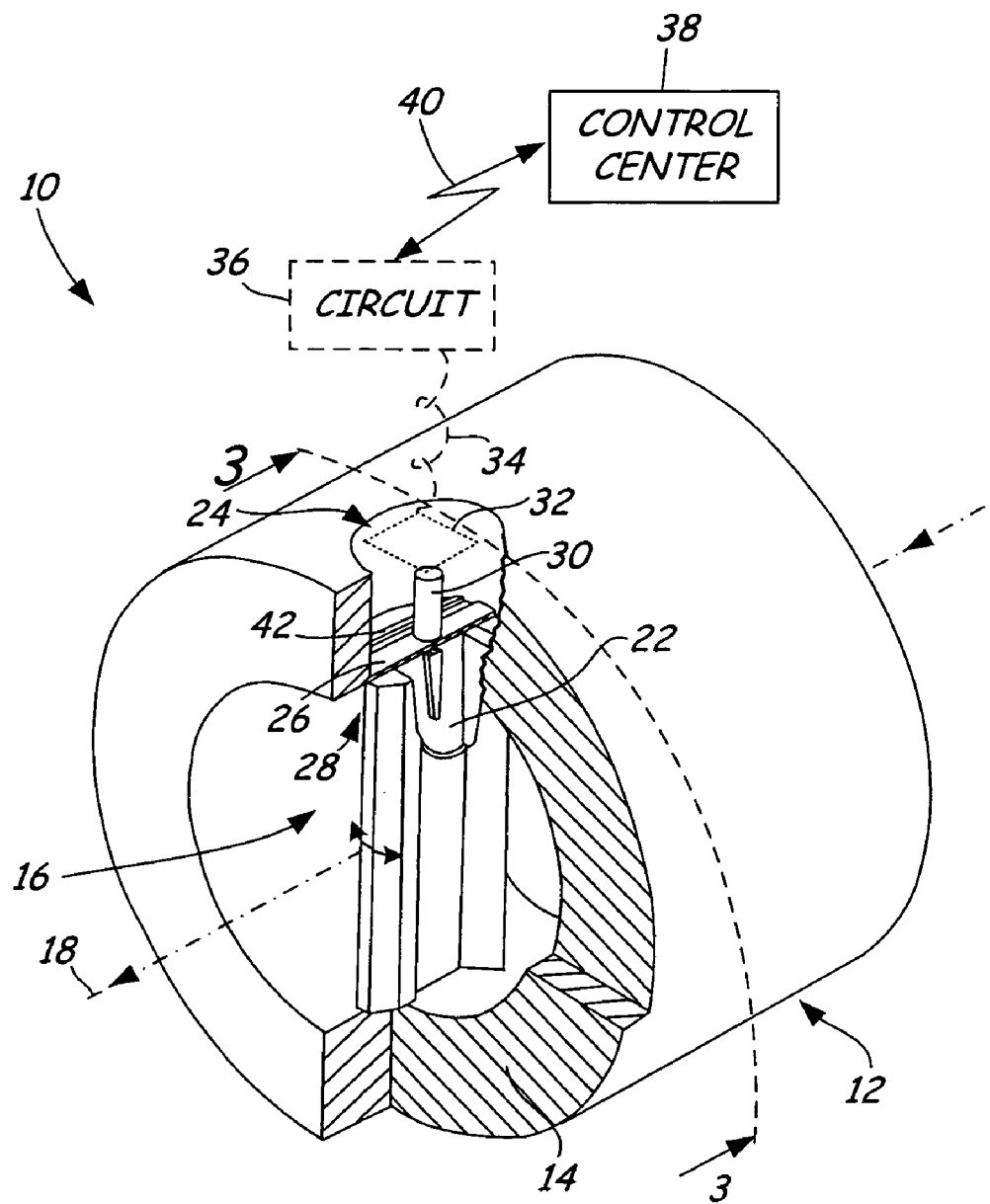
FIG. 1 is a partial cut away view of a flow meter in situ according to an embodiment of the present invention.

FIG. 1 illustrates an embodiment of a vortex flow meter of the present invention. Flowmeter 10 includes a conduit 12 having a wall 14 surrounding a bore 16. Bore 16 carries a fluid, which may be a liquid or a gas, generally along a bore axis 18. Shedding bar 20 is a vortex-generating obstruction. Pivoting member 22 extends from a hole 24 formed in wall 14 into bore 16. Fluctuating fluid pressures act on the shedding bar and on pivoting member 22, such that pivoting member 22 moves in response to the fluctuating pressures.

A center rib 26 is disposed in hole 24 and coupled to flexure 28. The flexure 28 is generally coupled to wall 14. Post 30 extends from the flexure 28. A sensing device 32 (shown in phantom) is coupled to the flexure 28, preferably by attachment to the post 30, and senses the motion of pivoting member 22. The sensing device 32 generates an output indicative of the sensed motion and communicates the output via lead 34 to circuitry 36. Typically, circuitry 36 is adapted to communicate the sensed motion to a control center 38 via a communications link 40 (which may be a two-wire, three-wire or four-wire loop, or which may be a wireless communications link 40).

Figure 2:
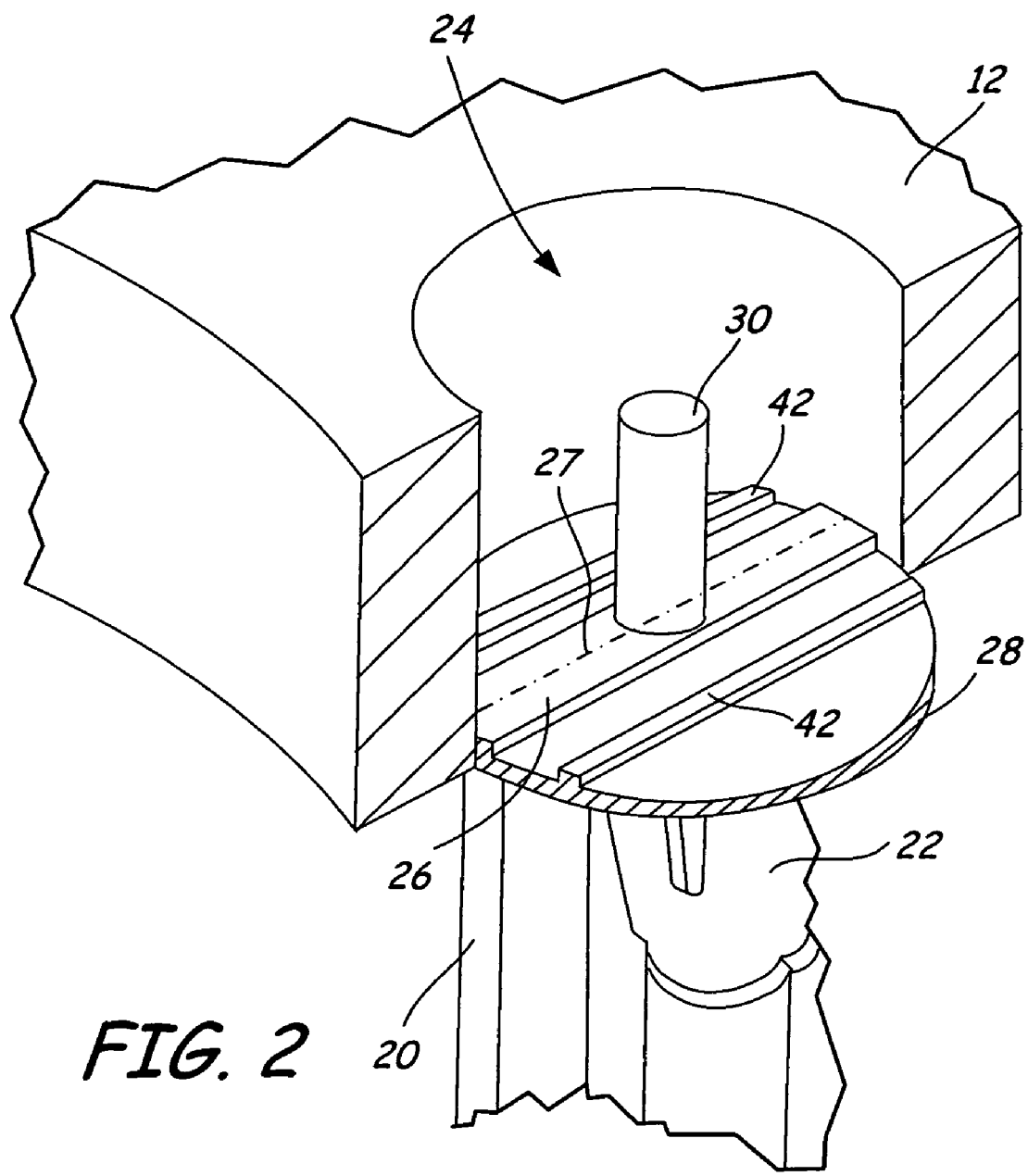
FIG. 2 is an enlarged view of the flexure portion of the flow meter of FIG. 1.

In a preferred embodiment, reinforcing ribs 42 are disposed on the flexure on either side of centerline 27 (or pivot line) of the flexure 28 (reference numeral 27 is shown in FIGS. 2 and 5). In general, the center rib 26 and the reinforcing ribs 42 extend parallel to the direction to the bore axis 18 (parallel to the direction of flow).

In one embodiment, the reinforcing ribs 42 are positioned on the flexure between a center of the center rib 26 and the outside edge of the flexure 28. The position may be quantified by considering a flexure 28 of diameter D, where the reinforcing ribs 42 are positioned at approximately 0.25D on either side of the center rib 26. In an alternative embodiment, the reinforcing ribs 42 are centered between the edge of the center rib 26 and the outside edge of the flexure 28 (at approximately 0.22D, for example, relative to the edge of the flexure 28). In this embodiment, the center rib 26 is approximately the same width as the post 30 and extends the entire diameter of the flexure 28. In an alternative embodiment, the center rib 26 is a fraction of an inch wider than the post 30 and extends the full diameter of the flexure. The reinforcing ribs are approximately the same relative height and width. In one embodiment, the reinforcing ribs have a height and a width that are approximately the same as the thickness of the flexure. It will be understood by a worker skilled in the art that the flexure 28 is curved so as to match the wall of the pipe. Thus, the height of the reinforcing ribs 42 is relative to the surface of the flexure 28, but varies relative to a fixed point according to a radius of curvature of the pipe.

Depending on the implementation, the rib size may be adjusted to account for different pressures and different flexure sizes. Additionally, the location of the reinforcing ribs 42 may be adjusted toward or away from the center line. In a preferred embodiment, the reinforcing ribs 42 are substantially centered between the center line of the flexure 28 and the outer edge of the flexure 28.

It is appreciated that these reinforcing ribs 42 add to the burst pressure strength of the meter. Adding the reinforcing ribs 42 to a meter typically increases the burst pressure of the meter by 50%. Additionally, the reinforcing ribs 42 increase the sensitivity of the flow meter to the alternating pressure from the fluidic vortices, by reducing the countervailing force on the sensor due to pressure on the flexure 28 of the meter 10.

FIG. 2 shows an expanded view of the flexure 28 of FIG. 1. As shown, the conduit 12 has an opening 24 in which a flexure 28 is disposed. Center rib 26 extends a full diameter of the flexure, and is positioned on a center line 27 of the flexure 28. In this embodiment, reinforcing ribs 42 are disposed on either side of the center rib 26 and extend to the outer edge of the flexure 28. The reinforcing ribs 42 are positioned at approximately a midpoint between the center line 27 and the outer edge of the flexure 28. Post 30 extends from the center rib 26 and away from the conduit 12. As previously discussed, in a preferred embodiment, the sensor is coupled to the shedding bar via the post 30.

FIG. 3 shows a cross sectional view of the vortex flow meter 10 of FIG. 1 taken along line 3—3. Flowmeter 10 includes a conduit 12 having a wall 14 surrounding a bore 16. Bore 16 carries a fluid, which may be a liquid or a gas, generally along a bore axis 18. Shedding bar 20 is a vortex-generating obstruction. Pivoting member 22 (shown in FIG. 1) extends from the wetted side of the flexure 28. Fluctuating fluid pressures act on the shedding bar and on pivoting member 22, such that pivoting member 22 moves in response to the fluctuating pressures.

In this embodiment, center rib 26 is disposed in hole 24 and coupled to flexure 28. The flexure 28 is generally coupled to wall 14. Post 30 extends from the flexure 28. Reinforcing ribs 42 are disposed on the flexure on either side of the center rib 26 on either side of a centerline of the flexure 28. In general, the center rib 26 and the reinforcing ribs 42 extend parallel to the direction to the bore axis 18 (parallel to the direction of flow). Flange element 46 couples a transmitter housing 48 (shown in phantom) to the meter body. The transmitter housing 48 may also contain circuitry for processing sensed data into a signal for transmission to a control center.

FIG. 4 illustrates an expanded cross-sectional view of the flexure 28. Flexure 28 is disposed in opening 24 within conduit 12. Center rib 26 is centered on the flexure 28, and reinforcing ribs 42 are approximately centered between the center rib 42 and the outer circumferential edge of the flexure 28. The center rib 26 and the reinforcing ribs 42 extend in parallel to each other and to the direction of fluid flow. Pivoting member 22 is disposed on shedding bar 20 and is coupled to the post 30 to cause the post 30 to move responsive to fluidic pressures experienced by the pivoting member 22 and the shedding bar 20.

In general, the flexure 28 (region of reduced thickness) has a thickness T. The reinforcing ribs 42 have a width W and a height H. It should be understood that the flexure 28 is curved to match the curvature of the pipe wall, such that the height H of the reinforcing ribs 42 is relative to the curved surface of the flexure 28. In a preferred embodiment, the width W and the height H are approximately equal to the thickness T.

FIG. 5 shows the flexure 28 from a top view looking into opening 24. The flexure 28 has a diameter D, which can be measured from edge to edge along the outer (non-wetted) surface of the flexure 28. In one preferred embodiment, the position of the reinforcing ribs 42 may be determined relative to the centerline (pivot line) 27 of the flexure 28, such that the reinforcing ribs 42 are centered at approximately 0.25D.

As previously discussed, the primary method of determining the pressure rating for a meter is a burst pressure test. In these tests, the flow meter is connected to a testing device and then pressurized until the meter fails because it can no longer retain the pressure. In all test cases, failures occurred in the flexure area, which is the thinnest wall section.

For the purposes of the ASME code, the safety factor for a meter is determined by the following equation:

$$SF = \frac{F \times BP}{P_r} \times \frac{T_s}{T_a}$$

where SF is the safety factor, F is a casting quality factor, BP is burst pressure, $P_r$ is rated pressure, $T_s$ is the material's tensile strength specification, and $T_a$ is actual tensile strength of the material tested as determined by a test specimen from the heat the casting is taken from.

Adding a reinforcing rib 42 to the flexure 28 between the centerline and the edge of the flexure 28 significantly increases the ultimate burst pressure. In one example test, the reinforcing ribs were approximately 0.035 inches wide and 0.070 inches tall and extended parallel to the center rib 26. The reinforcing ribs 42 were positioned at the area where the maximum total displacement occurred in the prior art design. Calculations predicted a greater than 30 percent increase in burst pressure. The tested device showed improvement in burst pressure of 50 percent.

Further analysis of the reinforced flexure design showed improved sensitivity over conventional flexure designs. Calculations predicted an increase in sensitivity of approximately 6 percent. In testing, the reinforcing ribs 42 increased sensitivity of the meter up to 20 percent in some embodiments.

It is also important to note that the center rib contributes to a restorative force tending to restore pivoting member 22 to its equilibrium position. The restoring force tends to increase the natural frequency of vibration of the pivoting member, which ensures that the natural frequency of the pivoting member 22 is greater than the highest vortex frequency encountered during operation. The reinforcing ribs may actually improve this restorative force.

Additionally, it should be noted that in the embodiments shown, the reinforcing ribs are offset from a pivot line of the region of reduced thickness. In a preferred embodiment, the reinforcing ribs are approximately centered between a pivot line and an edge of the region of reduced thickness, making the offset distance approximately the same. However, in some embodiments, it may be desirable to vary the position of the reinforcing ribs. For example, the position of the reinforcing ribs may be offset from the midpoint between the pivot line and the edge, by approximately the same distance. Alternatively, the reinforcing ribs may be spaced from the pivot line by slightly different distances so as to locate the reinforcing rib in a particular location on the region of reduced thickness.

Finally, while the above-discussion has largely described the reinforcing ribs as extending substantially parallel to the pivot line (or center rib), in some embodiments, it may be desirable to change the angle of reinforcing ribs relative to the center line. For example, in one embodiment, it may be desirable to position the reinforcing rib on the flexure adjacent to the pivot line and extending at an angle from the pivot line. In such an embodiment, the position of the reinforcing rib relative to the pivot line or the circumferential edge would vary depending on where the measurement was taken. By changing the angle, it may be possible to adjust the sensitivity of the meter while maintaining the improved pressure retention advantages.

Although the present invention has been described with reference to preferred embodiments, workers skilled in the art will recognize that changes may be made in form and detail without departing from the spirit and scope of the invention.

What is claimed is:

1. A vortex flow meter for measuring fluid flow comprising:
    a conduit for carrying a fluid;
    a region of reduced thickness in a portion of the conduit;
    a shedding bar disposed in the conduit coupled to the region of reduced thickness and configured to apply a rocking motion to the region of reduced thickness about a pivot line in response to flow of the fluid; and
    at least one reinforcing rib on the region of reduced thickness and extending parallel to flow of the fluid spaced from the pivot line.

2. The vortex flow meter of claim 1 wherein the at least one reinforcing rib is spaced from the pivot line by approximately one-quarter of a diameter of the region of reduced thickness.

3. The vortex flow meter of claim 2 further comprising:
    a second reinforcing rib extending parallel to flow of the fluid and positioned on an opposing side of the pivot line relative to the at least one reinforcing rib.

4. The vortex flow meter of claim 1 further comprising:
    a sensor coupled to the region of reduced thickness for sensing the motion thereof to provide an output indicative of the flow.

5. The vortex flow meter of claim 1 wherein the at least one reinforcing rib is positioned at approximately a midpoint between the pivot line and an edge of the region of reduced thickness.

6. The vortex flow meter of claim 1 further comprising:
    a center rib extending parallel to flow of the fluid and positioned on the pivot line.

7. The vortex flow meter of claim 6 further comprising:
    a post disposed outside of the conduit and coupled to the center rib.

8. The vortex flow meter of claim 7 further comprising:
    a sensor coupled to the post for sensing the motion thereof to provide an output indicative of the flow.

9. The vortex flow meter of claim 1 wherein the at least one reinforcing rib has a height approximately equal to a thickness of the region of reduced thickness.

10. The vortex flow meter of claim 1 wherein the at least one reinforcing rib extends from edge to edge across the region of reduced thickness.

11. A vortex flow meter for measuring fluid flow comprising:
    a conduit for carrying a fluid;
    a region of reduced thickness in a portion of the conduit;
    a shedding bar disposed in the conduit coupled to the region of reduced thickness and configured to apply a rocking motion to the region of reduced thickness about a pivot line in response to flow of the fluid; and
    at least one reinforcing rib extending parallel to the pivot line from edge to edge across the region of reduced thickness spaced from the pivot line.

12. The vortex flow meter of claim 11 and further comprising:
    a sensor coupled to the region of reduced thickness for sensing the motion thereof to provide an output indicative of the flow.

13. The vortex flow meter of claim 11 wherein the at least one reinforcing rib is positioned at approximately a midpoint between the pivot line and a circumferential edge of the region of reduced thickness.

14. The vortex flow meter of claim 11 further comprising:
    a center rib coupled to the area of reduced thickness and positioned on the pivot line.

15. The vortex flow meter of claim 14 further comprising:
    a post disposed outside of the conduit and coupled to the center rib; and
    a sensor coupled to the post for sensing the motion thereof to provide an output indicative of the flow.

16. The vortex flow meter of claim 11 further comprising:
    circuitry coupled to the sensor and adapted to communicate the output of the sensor to a control center.

17. The vortex flow meter of claim 11 further comprising:
    a second reinforcing rib extending parallel to the pivot line and positioned on an opposing side of the pivot line relative to the at least one reinforcing rib.

18. A vortex flow meter for measuring fluid flow comprising:
    a conduit for carrying a fluid;
    a region of reduced thickness formed in a portion of the conduit;

a shedding bar disposed in the conduit coupled to the region of reduced thickness and adapted to apply a rocking motion to the region of reduced thickness about a pivot line in response to flow of the fluid; and at least one reinforcing rib on the region of reduced thickness spaced from the pivot line.

19. The vortex flow meter of claim 18 further comprising:

a sensor coupled to the region of reduced thickness for sensing the motion thereof to provide an output indicative of the flow.

20. The vortex flow meter of claim 19 further comprising:

circuitry coupled to the sensor and adapted to communicate the output of the sensor to a control center.

21. The vortex flow meter of claim 18 wherein the at least one reinforcing rib is positioned at approximately a midpoint between the pivot line and an edge of the region of reduced thickness.

22. The vortex flow meter of claim 18 wherein the at least one reinforcing rib extends less than a full length of the region of reduced thickness.

23. The vortex flow meter of claim 18 further comprising:

an center rib coupled to the area of reduced thickness and positioned on the pivot line.

24. The vortex flow meter of claim 18 wherein the region of reduced thickness has a diameter D and wherein the at least one reinforcing rib is positioned at a distance 0.25D from an edge of the region of reduced thickness.

25. The vortex flow meter of claim 18 further comprising:

a second reinforcing rib extending parallel to the pivot line and offset from the at least one reinforcing rib and from the pivot line.

26. The vortex flow meter of claim 25 wherein the at least one reinforcing rib and the second reinforcing rib are positioned on opposing sides of the pivot line.

27. The vortex flow meter of claim 26 wherein the at least one reinforcing rib and the second reinforcing rib are offset by a substantially equal amount.

28. The vortex flow meter of claim 18 wherein the region of reduced thickness has a thickness, and wherein the at least one elongate reinforcing rib comprises:

dimensions of width and height, such that width and height are approximately equal to the thickness.

* * * * *